US012802444B2

(12) United States Patent
Figueras Junyent

(10) Patent No.: US 12,802,444 B2
(45) Date of Patent: Nov. 17, 2026

(54) VIDEO ANALYTICS SYSTEM

(71) Applicant: Awaait Artificial Intelligence, S.L. (AWAAIT), Barcelona (ES)

(72) Inventor: Andreu Figueras Junyent, Barcelona (ES)

(73) Assignee: Awaait Artificial Intelligence, S.L. (AWAAIT), Barcelona (ES)

( * ) Notice: Subject to any disclaimer, the term of this patent is extended or adjusted under 35 U.S.C. 154(b) by 520 days.

(21) Appl. No.: 18/000,643

(22) PCT Filed: Jun. 1, 2021

(86) PCT No.: PCT/EP2021/064685
§ 371 (c)(1),
(2) Date: Dec. 2, 2022

(87) PCT Pub. No.: WO2021/245088
PCT Pub. Date: Dec. 9, 2021

(65) Prior Publication Data

US 2023/0222798 A1 Jul. 13, 2023

(30) Foreign Application Priority Data

Jun. 2, 2020 (EP) .................................... 20382473

(51) Int. Cl.
*G06V 20/40* (2022.01)
*G06T 3/04* (2024.01)
(Continued)

(52) U.S. Cl.
CPC ................ *G06V 20/46* (2022.01); *G06T 3/04* (2024.01); *G06T 7/50* (2017.01); *G06V 10/774* (2022.01);
(Continued)

(58) Field of Classification Search
CPC ...... G06V 20/46; G06V 10/774; G06V 20/49; G06T 3/04; G06T 7/50;
(Continued)

(56) References Cited

U.S. PATENT DOCUMENTS 9,338,409 B2 * 5/2016 Zhang .................. A61B 5/0013
10,304,203 B2 * 5/2019 Forutanpour ........... G06T 17/00
(Continued)

FOREIGN PATENT DOCUMENTS

JP 2012-155595 A 1/2024

OTHER PUBLICATIONS

Computer Vision-Based Structural Assessment Exploiting Large Volumes of Images, Chul Min Yeum (Year: 2016).*
(Continued)

*Primary Examiner* — Jennifer Mehmood
*Assistant Examiner* — Pardis Sohraby
(74) *Attorney, Agent, or Firm* — TraskBritt

(57) ABSTRACT

A computer-implemented method for sampling and analyzing data from at least one image frame from at least one series of image frames captured by at least one sensor, comprises: defining at least one sampling model, wherein the sampling model is defined in a virtual 3D-vector space and is based on one or more predetermined shapes in the virtual 3D-vector space, applying the at least one sampling model to at least one part of the at least one image frame of the at least one series of image frames, wherein applying of the at least one sampling model defines at least one area of the at least one image frame from which data is to be extracted, extracting data from the at least one area of the at least one image frame defined by the sampling model, and analyzing the extracted data.

15 Claims, 5 Drawing Sheets

(51) Int. Cl.
*G06T 7/50* (2017.01)
*G06V 10/774* (2022.01)

(52) U.S. Cl.
CPC .... *G06V 20/49* (2022.01); *G06T 2207/10016* (2013.01); *G06T 2207/20021* (2013.01); *G06T 2207/20081* (2013.01)

(58) Field of Classification Search
CPC . G06T 2207/10016; G06T 2207/20021; G06T 2207/20081; G06T 2207/30196; G06T 7/579; G06T 7/11
USPC .......................................................... 382/159
See application file for complete search history.

(56) References Cited

U.S. PATENT DOCUMENTS

| | | | |
|---|---|---|---|
| 2013/0182114 A1 | 7/2013 | Zhang et al. | |
| 2016/0042558 A1* | 2/2016 | Park | G06T 15/06 345/426 |
| 2016/0140397 A1* | 5/2016 | Zhang | G06T 7/246 382/103 |
| 2018/0335925 A1* | 11/2018 | Hsiao | G06F 3/017 |
| 2020/0302237 A1* | 9/2020 | Hennings Yeomans | G06V 20/56 |

OTHER PUBLICATIONS

European Extended Search Report for Application No. 20382473.5 dated Nov. 24, 2020, 10 pages.
Han et al., Image-Based 3D Object Reconstruction: State-of-the-Art and Trends in the Deep Learning Era, Deep Learning-Based 3D Object Reconstruction—A Survey, IEEE Transactions on Pattern Analysis and Machine Intelligence, (Nov. 2019), pp. 1-27.
International Search Report for International Application No. PCT/EP2021/064685 dated Sep. 9, 2021, 4 pages.
International Written Opinion for International Application No. PCT/EP2021/064685 dated Sep. 9, 2021, 7 pages.
Knyaz et al., Image-to-Voxel Model Translation with Conditional Adversarial Networks, https://openaccess.thecvf.com/content_ECCVW_2018/papers/11129/Knyaz_Image-to-Voxel_Model_Translation_with_Conditional_Adversarial_Networks_ECCVW_2018_paper.pdf, (2018), 19 pages.
Yang et al., A Multi-Camera Network System for Markerless 3D Human Body Voxel Reconstruction, Image and Graphics, (Sep. 2009), pp. 706-777.
Japanese Notification of Reasons for Refusal for Application No. 2022-574282 dated Jan. 4, 2024, 8 pages.
Chinese First Office Action for Application No. 202180039814.4 dated Jul. 17, 2025, 18 pages with English translation.
Yeum, Chul Min, Computer Vision-Based Structural Assessment Exploiting Large Volumes of Images, (2016), Open Access Dissertations 1036, https://docs.lib.purdue.edu/open_access_dissertations/1036, 24 pages.

* cited by examiner

VIDEO ANALYTICS SYSTEM

CROSS-REFERENCE TO RELATED APPLICATIONS

This application is a national phase entry under 35 U.S.C. § 371 of International Patent Application PCT/EP2021/064685, filed Jun. 1, 2021, designating the United States of America and published as International Patent Publication WO 2021/245088 A1 on Dec. 9, 2021, which claims the benefit under Article 8 of the Patent Cooperation Treaty to European Patent Application Serial No. 20382473.5, filed Jun. 2, 2020.

TECHNICAL FIELD

Embodiments of the present disclosure relate to a computer-implemented method for sampling and analyzing data from at least one image frame from at least one series of image frames captured by at least one sensor, to a computer readable storage media having stored therein instructions that, when executed by one or more processors, direct the one or more processors to perform such a method, and to a video analytic system that may be used to carry out such a method.

BACKGROUND

Image and/or video analytics systems are frequently used in order to survey or monitor scenes, places, objects and/or subjects, persons or crowds of interest in order to detect and alert on the occurrence of certain situations, patterns, movements, actions of behaviors. In the following, the detection of certain or classifiable situations, patterns, movements, actions or behaviors, etc., may, inter alia, simply be referred to as "detection problem" or "problem to be detected" by an image and/or video analytics system.

For example, image and/or video analytics systems may use captured image and/or video data for detecting fraudulent or illegal access events, such as tailgating or piggybacking at control gates or doors, with a typical example of such kind of fraudulent access, for instance, being the case of one or more subjects or persons attempting to pass a control gate, e.g., a fare gate of a metro station, taking advantage of the safety delay in the gate closure after a previous subject or person has validly passed, another example being a subject jumping over the fare gate. Such illegal access events can be more varied in case of other access control gates, e.g., tripod turnstiles, wherein the mode of fraud might be the fare dodger jumping over the turnstile, passing under it, passing together with another passenger within the same turnstile turn (in a mode usually named as 2×1) or swinging an upper tripod turnstile arm back and forth to use the movement allowance in some turnstiles (typically present at the ones designed for both entry and exit passage) to enter the paying zone without validating the fare.

However, it remains a challenge for current systems and techniques to provide reliable, accurate, fast, real-time, automated detection and alerts, in particular, when processing a larger quantity of image and video data from different scenes, different point of views and different perspectives, for example, captured by a plurality of different cameras, wherein the cameras may be stationary or may be moving themselves.

It is therefore an object of the present disclosure to improve a computer-implemented video analytics method and video analytic system for analyzing image and/or video data to detect certain situations, patterns, movements, actions of behaviors of interest. For example, this may comprise improving a computer-implemented video analytics method and video analytic system, in particular, with respect to automation, speed, efficiency, reliability and simplicity.

BRIEF SUMMARY

An exemplary computer-implemented video analytics method according to the present disclosure for detecting a desired specific, e.g., a classifiable, pattern or problem in image and/or video data may comprise a computer-implemented method for sampling and analyzing data from at least one image frame from at least one series of image frames captured by at least one sensor, and may comprise one or some or all of the following steps:

- defining at least one sampling model, wherein the sampling model is defined in a 3D-vector space or virtual 3D-vector space and is based on one or more predetermined shapes in the 3D-vector space or virtual 3D-vector space,
- applying the at least one sampling model to at least one part of the at least one image frame of the at least one series of image frames, wherein applying of the at least one sampling model defines at least one area of the at least one image frame from which data is to be extracted,
- extracting data from the at least one area of the at least one image frame defined by the sampling model,
- and analyzing the extracted data.

In other words, the exemplary steps for sampling and analyzing data from at least one image frame from at least one series of image frames captured by at least one sensor described above may be used in a computer-implemented video analytics method or video analytics system, e.g., video analytics system configured for detecting a problem.

A series or sequence of image frames may inter alia be understood as a video stream or as a series or sequence of image frames extracted a video stream, wherein the image frames are captured by a sensor. A sensor is herein inter alia to be understood as a device that can generate data suitable to be represented as images. The term camera is inter alia to be understood as referring to all such devices or sensors.

Furthermore, it is to be understood that images or image frames are/can be in a digital format, e.g., an array of digital pixels, or have been/can be converted from an analog format to a digital format.

Herein the expression of analyzing the extracted data can be understood as comprising analyzing the extracted data from the at least one area of the at least one image frame defined by the sampling model for detecting a desired specific, e.g., a pre-defined or classifiable, problem or situation of interest, e.g., the occurrence of certain situations, patterns, movements, actions of behaviors, etc., in the captured image data and/or video data of scenes, places, objects and/or subjects, persons or crowds of interest, i.e., in the data extracted from at least one image frame from at least one series of image frames captured by at least one sensor, e.g., a camera.

In other words, the extracted data from the at least one area of the at least one image frame defined by the sampling model can serve as input data for the analysis and detection of exemplary situations or problems of interest.

The at least one image frame from at least one series of image frames captured by at least one sensor can be understood as representing or comprising image data from a scene observed in real physical three-dimensional space or 3D-space.

The term applying in the exemplary step of applying the at least one sampling model to at least one part of the at least one image frame may inter alia be understood as comprising a step of mapping or projecting the at least one sampling model to at least one part of the at least one image frame.

The terms virtual 3D-vector space or 3D-vector space used herein can inter alia be understood as abstract or numerical three-dimensional vector space(s) that can be mapped to data in or extracted from the at least one image frame captured by at least one sensor.

In other words, the virtual 3D-vector space or 3D-vector space can refer to an abstraction or numerical representation or approximation of the physical real three-dimensional space or 3D-space observed and captured in image frames by the at least one sensor.

As mentioned above, the sampling model can be defined in a 3D-vector space or virtual 3D-vector space and can be based on one or more, e.g., a set of predetermined shapes in the 3D-vector space or virtual 3D-vector space.

These exemplary one or more predetermined shapes in the exemplary virtual 3D-vector space can be selected from at least one of the following shapes: three-dimensional shapes, i.e., 3D-shapes, two-dimensional shapes, i.e., 2D-shapes, one-dimensional shapes, i.e., 1D-shapes or zero-dimensional shapes, i.e., 0D-shapes.

Therein, 3D-shapes can have a volume and a surface oriented and positioned in 3D-vector space, 2D-shapes can have a surface oriented and positioned in 3D-vector space, 1D-shapes can have a spatial extension or length and can be oriented and positioned in 3D-vector space and 0D-shapes can be points, or point-like objects, positioned in 3D-vector space. In other words, the shapes can have a defined orientation and/or position in (virtual) 3D-vector space.

In particular, for example, 3D-shapes can be parallelepipeds, e.g., including cuboids, and/or polyhedrons and/or spheres and/or partial spheres and/or cylinders and/or partial cylinders and/or 2D-shapes can be planar or curved surfaces and/or parallelograms and 1D-shapes can be straight or curved lines or straight or curved lines line segments. However, it is emphasized that other 3D- or 2D-shapes different from the aforementioned types may be used as well in a sampling model.

The possible use of parallelepipeds as 3D-shapes as part of a/the least one sampling model, as will also become evident from further examples provided below, can inter alia lead to an enhanced and faster processing of the image frames to be analyzed, last but least due to the computational ease of extracting data from an image frame using the 3D-shape(s) as part of a/the sampling model and due to the computational ease of storing and processing data extracted from an image frame using a sampling model comprising parallelepipeds in form of multi-dimensional arrays, e.g., 3D-Tensors.

Furthermore, parallelepipeds can be considered as a suitable and versatile shape for approximating a large number of real life objects, e.g., gates, boxes, houses, cars, with sufficient accuracy for most applications/problems to be detected by video analytics.

Moreover, parallelepipeds are rather easy to define with a set of three spatial vectors, thereby simplifying parametrization (i.e., the modelling of such shapes) and improving computational efficiency when parallelepipeds are used as 3D-shapes in a sampling model.

A convenient 2D-shape oriented and positioned in 3D-vector space, can, for example, be a parallelogram. Again the computational ease with which such a 2D-shape can be defined using two spatial vectors can be beneficial for the parametrization and computational efficiency of a sampling model comprising such a 2D-shape. As for parallelepipeds, another advantage of the use of parallelograms can be that a large number of real life objects, e.g., streets, squares, signs, are rectangular objects or are reasonably well described by rectangles, and can therefore be represented and approximated with high accuracy by such 2D-shapes in a sampling model.

The at least one sampling model defined in a/the 3D-vector space or virtual 3D-vector space and which can be used and applied according the steps described above and herein may be based on any combination and any number of any of the above-identified 3D- and/or 2D- and/or 1D- and/or 0D-shapes defined in (virtual) 3D-vector space. Stated differently, the exemplary sampling model(s) defined in a/the 3D-vector space or virtual 3D-vector space can consist of a plurality of combinations and any number of predetermined shapes that can be understood as forming a sampling model space that can be transformed or mapped to or applied to or projected onto the at least one part of the at least one image of the at least one series of image frames, which can be referred to as "image frame space" or "projected 3D-space."

When applying or mapping or projecting the at least one sampling model to the at least one part of the at least one image of the at least one series of image frames, the at least one sampling model can be correlated with one or more reference points in the at least one image frame of the at least one series of image frames.

In particular, the correlating of the sampling model with one or more reference points in the at least one image frame may comprise carrying out a mapping transformation or projection, e.g., a parallel projection, between one or more points of the at least one sampling model and the one or more reference points in the at least one image of the at least one series of image frames.

The exemplary reference points may be easily identifiable features, for example, vertices or marks in furniture or equipment or objects or other architectonical features, the coordinates of which, for instance, can be correlated between the 3D real space and the 2D projection, especially when their real 3D coordinates (absolute or relative) are known or can be inferred from the physical real dimensions of such furniture or objects or equipment or other architectonical features.

Alternatively, dedicated objects or signs might be placed in the real 3D-scene temporarily or permanently to serve as reference points.

For example, reference points are already existing and well identifiable in the real 3D-space and its 2D-projected space (video stream) thanks to elements like vertices or marks in furniture or equipment or other architectonical features, the coordinates of which, for instance, can be correlated between the 3D real space and the 2D projection, especially when their real 3D coordinates (absolute or relative) are known or can be inferred from the physical real dimensions of such furniture or equipment or other architectonical features.

However, it is noted that the computed projection or mapping of the sampling model defined in 3D space, e.g., comprising 3D-shapes, onto the image frame does not need to be a perfect 3D to 2D projection according highly intricate mathematical projection procedures: an approximated projection, for instance, a simple parallel projection (e.g., where parallels on the 3D space keep parallelism in the 2D projection) may be good enough to obtain acceptable results.

In an exemplary case wherein the perspective of the image frame to be analyzed is unfavorable such as the vanishing point being not far from the center of the image or in case the image suffers some aberration, like the spherical aberration associated with broad angle lenses, multiple local and simple transformations can be used instead of working out a fitted transformation for the whole scene of the image frame.

Hence, a mapping transformation or transformation or projection between the 3D-vector space or virtual 3D-vector space and the projected real 3D-space captured in the least one image frame and which represents a two-dimensional projection of the real physical 3D-space, can be established.

The above exemplary described pre-determined shapes in (virtual) 3D-vector space on which the at least one sampling model can be based on, can themselves be divided into one or more elements or blocks that constitute the shapes, in particular, the shapes in the virtual 3D-vector space on which the sampling model can be based on can be divided evenly or non-evenly in any or all its geometric dimensions into one or more elements or blocks or sub-shapes that constitute the pre-determined shapes.

The elements or blocks that can constitute a shape in (virtual) 3D-vector space can also be defined as non-divisible smallest unit of a shape and may be also referred to as "shape atom" or "primitive" or "voxel."

The extracting data from the at least one part of the at least one image of the at least one series of image frames onto which the sampling model was applied to or was mapped to or was projected onto, may comprise extracting data from image frame pixels that are in an image frame area contained in or covered by a shape of the sampling model applied to the at least one part of the at least one image.

In other words, applying or mapping or projecting the at least one sampling model can define at least one area of interest or region of interest, e.g., a perimeter of an area of interest or region of interest, of the at least one image frame from which data is to be extracted.

In particular, extracting data from the at least one part of the at least one image frame of the at least one series of image frames onto which the sampling model was applied to or was mapped to or was projected onto, may comprise extracting data from image frame pixels that are in an image frame area contained in or covered by an element or block of a shape of the sampling model applied to the at least one part of the at least one image.

Stated differently, each element or block of a shape of the sampling model applied to the at least one part of the at least one image can define a projected area on the at least one part of the at least one image frame.

More specifically, for example, each non-divisible smallest unit of a shape, i.e., each shape atom or primitive or voxel, can define a corresponding projected area, i.e., a projected shape atom area or a projected primitive area or a projected voxel area, on the at least one part of the at least one image frame onto which the sampling model is applied to, thereby defining one or more areas, e.g., pixel areas, on the image frame from the at least one series of image frames captured by the at least one sensor from data can be extracted or read out.

The as above exemplary described extracted or read out data from the above exemplary described projected area(s) on the image frame, i.e., from image frame pixel within the projected area(s), defined by the at least one sampling model can then be saved or stored in one or more arrays, e.g., in one or more a multi-dimensional arrays, for example, in one or more tensors.

It is to be noted, that projected areas from different shapes or from different non-divisible smallest unit of a shape of a sampling model, i.e., from different shape atoms or different primitives or different voxels, can overlap.

As indicated above, once the sampling model has been projected on the image frame, each one of its projected shapes of elements or blocks of a shape or shape atoms or shape primitives or shape voxels can define an area and/or a perimeter on the image frame. For example, in the case of projecting a (virtual) 1D-shape of a sampling model, this projected area and perimeter may become the same, i.e., resulting in the projected voxel being just a line.

In the case of projecting a (virtual) 0D-shape of a sampling model, the projected area and perimeter may collapse to single point or single pixel or fraction of a pixel in the image frame to be analyzed.

The extracting of information from the image frame to be analyzed, i.e., the extraction of data contained in an image frame defined by a projected shape area, e.g., the data contained in a corresponding projected voxel area or contained in its perimeter or contained in a combination of both, may inter alia comprise extracting one or multiple image pixel data values per projected shape, i.e., per projected element or block of a shape, in particular, per shape atom or shape primitive or shape voxel.

In particular, extracting data from the at least one area of the at least one image frame defined by the sampling model can comprise extracting pixel values, such as brightness and/or color, e.g., color in a color space model, such as the RGB color model, from the pixels identified by the sampling model, e.g., the image frame pixels that lie within a projected shape area(s) and/or along or on a projected perimeter of a projected shape, i.e., of a shape projected onto the image frame.

It is emphasized herein that the terms area or region covered on the/an image frame by a shape or predetermined shape of a sampling model applied to/mapped to/projected onto an/the image frame can also refer to lines of pixels or just individual pixels or fraction of pixels of the image frame. In other words also the projections of 1D-shapes or 0D-shapes of a sampling model can define an area or areas on the/on an image frame to define a set of pixels or one or more pixels from which data is to be extracted.

Furthermore, the extraction of data from at least one part of the at least one image frame onto which the sampling model was applied to may comprise transforming the data.

For example, the data, e.g., pixel data, extracted of image pixels within the projected shape area, e.g., within the projected shape atom area or projected shape primitive area or, i.e., the data extracted of image pixels covered or defined by the at least one sampling model may be transformed by computing the maximum, or minimum, or average, or mode of the pixel values within the projected shape area(s) and/or along the projected perimeter(s).

Another exemplary transformation of extracted data, i.e., data, e.g., pixel data, extracted of image pixels within a projected shape area may comprise applying a function to some or all of the extracted data. For example, applying a weighted average of some or all of the data values extracted from pixels of the image frame within a/the projected shape area(s), e.g., within a projected voxel area and/or or within a perimeter or along a perimeter of the projected shape area(s), or parts thereof.

Such an optional data transformation may facilitate further processing and analysis of the extracted data and may, for example, reduce computational burden, e.g., by compressing or compactifying the data, when using the extracted data for the detection of the above-mentioned situations and problems.

Alternatively or in addition it is conceivable, that the whole image frame or at least a part of the at least one image frame onto which the sampling model is applied to/mapped to/projected onto, can be subjected to a pre-treatment or pre-processing before the extraction of data from the image frame.

In this context, an image frame without any pre-treatment or pre-processing may also be referred to as "raw image frame" or "raw image."

For example, it may be possible to carry out digital processing on at least parts of the image frame to determine edges and/or contours and/or movement flows and/or to blur the at least parts of the image frame and/or modifying by digital processing the contrast or illumination or other characteristics of the raw image, or computationally segmenting the raw image or part thereof, or a combination of these and/or other digital image treatment procedures.

Such an optional and exemplary pre-treatment or pre-processing may inter alia facilitate image data extraction and analysis of the extracted data for a given situation or problem to be detected, since such a pre-treatment or pre-processing may increase the signal-to-noise ratio of a to be detected data signal for a/the to be detected situation or problem.

In the herein exemplary described video analytics method and video analytic system it is inter alia possible that the same sampling model can be applied to different parts of the at least one image of the at least one series of image frames.

Alternatively or in addition it is possible that the same sampling model can be applied to a plurality of images of the at least one series of image frames or that the same sampling model can be applied to all of the images of the at least one series of image frames.

Furthermore, the same sampling model can be applied to a plurality of images of a plurality of different series of image frames, such as, for example, a plurality of different series of image frames captured by one or more sensors with different perspectives of the same scene or scenario to analyzed.

It is further to be noted that the expression "same sampling models" can refer to identical sampling models and/or to sampling models with the same topology, e.g., having predetermined shapes with the same topology.

When the position of a sensor, e.g., a camera, for capturing images from a scene or scenario in real 3D-space, the perspective and/or field of view of the sensor can change too and this can result also in changes in the apparent size, shape and even color of the different elements, objects or subjects within its view.

Different sensors, e.g., cameras, in the same location or in different locations may therefore have different perspectives of a problem or situation to be detected.

Even a single sensor, e.g., a single camera, may capture various instances of the same problem, located in different regions of the captured scene, therefore at a different distance and orientation from the sensor's or camera's point of view.

As indicated previously, the processing and analyzing of image data with different perspectives of the same scene or situation is a challenge for current state-of-the-art video analytic systems and techniques.

For example, parameters of a solving model fora problem or a situation to detected and analyzed from the image data having a plurality of different viewing perspectives need to be tweaked and adjusted separately for every single different instance of a problem, scene or scenario to be analyzed, e.g., for every single different viewing perspective of the same problem, scene or scenario in real 3D-space to be analyzed, in order to, for example, try to account for changes in the apparent size, shape and even color of the different elements, objects or subjects within the same scene or scenario captured by one or more sensors from different point of views.

In particular, for example, when using machine learning algorithms and techniques for analyzing data extracted from images to detect a specific problem or situation, a specific training need to be run for each instance of a problem to detected, e.g., for each single different viewing perspective of a scene or scenario in real 3D-space in which the specific problem or situation is to be detected and analyzed, a specific training or specific training data set and/or a specific different sampling model is required.

Alternatively or in addition, for example, further parameters for a solving model might be needed to properly analyze the different perspectives between problem instances, with the corresponding need for an increased or enlarged set of labelled samples of training data, e.g., training image frames, from different perspectives, for the machine-learning model to learn appropriately.

It has been unexpectedly and surprisingly found that the above and herein described video analytics system method for sampling and analyzing data from at least one image frame to detect a specific problem or situation in a scene or scenario in real 3D-space captured in at least one image frame by at least one sensor, the same training or same trainings data or same sampling model can be used to effectively and efficiently train a machine learning algorithm to reliable detect a desired problem or situation in scene or scenario in real 3D-space, for all or the majority of possible different instances of a problem, i.e., for all or the majority of possible different viewing perspectives of images taken by at least one sensor with different point of views.

In other words, as described above and herein, the same sampling model is defined in a virtual 3D-vector space and is based on one or more predetermined shapes in the virtual 3D-vector space, can be applied to one or more instances of the same problem or situation to be detected within a video stream (e.g., a series of image frames obtained from one sensor) and/or can be applied to other different instances of the same problem or situation to be detected in a plurality of different video streams (e.g., series of image frames obtained from a plurality of different sensors) from the same scene or from a different scene in real 3D-space and the same detection and/or analyzing method or algorithm, e.g., the same machine learning algorithm, can be used to reliable detect a desired problem in all or in the majority of instances of the problem or in all or in the majority of instances of similar problems.

Stated differently, the herein exemplary described sampling technique greatly simplifies and reduces the complexity and computational burden of analyzing video streams to detect a desired problem or situation in a scene in real 3D-space, captured by a sensor or a plurality of sensors.

The herein exemplary described sampling technique(s) for extracting data and analyzing data from image frames from at least one series of image frames captured by at least one sensor observing or monitoring a scene in real 3D-space, provides a more accurate, more efficient and more effective representation in the (virtual) 3D-vector space, that is used for video analytic analysis, of real physical objects or subjects, in particular, real three-dimensional objects or subjects, that are present in the image frames captured by the sensor as compared to common sampling technique for extracting data and analyzing data from image frames of video streams, which do not take into account the three-dimensional spatial information present in image frames from a scene in real 3D-space, but that just use a flat, two-dimensional approach when sampling, extracting and analyzing data from image frames of a video stream.

As mentioned previously mentioned the data extracted from the at least one area of the at least one image frame defined by the sampling model can be used to detect a specific problem or pattern or situation.

For example, the to be detected problem(s) or pattern(s) or situation(s) may comprise a predetermined situation and/or movement and/or behavior and/or action of objects and/or subjects within a real 3D-scene, e.g., a fraudulent access at a control gate or fare gate, that is represented/present in the at least one part of the at least one image of the at least one series of image frames captured by the at least one sensor.

For example, in case the task of a video analytic system is to detect problems or situation at control gates or fare gates, the video analytics detection objective may be to count the number of passengers crossing and/or to detect and count fare evaders.

Another example for a type of a to be detected problem(s) or pattern(s) or situation(s) may be doors, where the objective might be to count people crossing in one direction or the other, and to trigger an alarm in case of crossing the door the wrong way or in a group instead of individually.

Yet a further example can be the monitoring or surveillance of a room, even a small space like the inside of an elevator, or an open space, or somehow delimited areas within open spaces where the intention is to detect an object left behind, or a panic situation (e.g., people moving at an abnormal speed), or a fight, or loitering, or oversized objects, or speed monitoring, or detection of people or vehicles or other objects invading the space or moving within the space, or estimation or determination of the occupancy level, or other situations.

Upon detection of the specific problem(s) or pattern(s) or situation(s) by a video analytic system using the herein described sampling techniques for extracting data and analyzing data from image frames, it is possible to provide a notification or alarm, for example, to a user of the video analytic system or to another software component.

To analyze the extracted data in order to detect a specific problem(s) or pattern(s) or situation(s) by a video analytic system using the herein described sampling techniques a machine learning system can be used, wherein, for example, the extracted data can be used as input data for a machine learning system to train the machine learning system for the detection of one or more desired pattern(s) or problem(s) or situation(s) that are represented in/present in the at least one part of the at least one image of the at least one series of image frames captured by the at least one sensor, for example, any of the exemplary above-described patterns or problems or situations, e.g., comprising a predetermined situation and/or movement and/or behavior and/or action of objects and/or subjects within a real 3D-scene, e.g., a fraudulent access at a control gate or fare gate or any other type of a desired to be detected problem or pattern or situation.

Herein, the detection of one or more a desired pattern(s) or problem(s) or situation(s) that are represented in/present in the at least one part of the at least one image of the at least one series of image frames captured by the at least one sensor, can inter alia comprise detecting a plurality of patterns or problems or situations or a plurality of different types or different classes or different classifications of a pattern or problem or situation present in/represented in at least one part of the at least one image. For example, in the case of a fraudulent access at a control gate or fare gate such as a tripod turnstile the analysis of the extracted data can at the same time not only detect whether a fraudulent access, e.g., a fare evasion event, has occurred, but the analysis of the same extracted data can also detect/determine/classify what kind/what type of fraudulent access has occurred, e.g., a jump of a subject over the turnstile or a subject passing below the turnstile or a subject swinging the turnstile or two subjects passing together.

Once a possible exemplary machine learning system is trained for detecting one or more desired pattern(s) or problem(s) or situation(s) that is/are represented in/present in the at least one part of the at least one image of the at least one series of image frames captured by the at least one sensor, e.g., one or more predetermined situation(s) and/or movement(s) and/or behavior(s) and/or action(s) of objects and/or subjects within a real 3D-scene such as exemplary described above, the extracted data as can be used as input data to the trained machine learning system in order to analyze the data and to detect the presence or absence of one or more desired pattern(s) or problem(s) or situation(s) with reliable accuracy.

It is further possible that applying or mapping or projecting the at least one sampling model to/onto at least one part of the at least one image frame of the at least one series of image frames may comprise taking into account a movement of the at least one sensor during capturing of image frames from the at least one series of image frames.

For example, if the sensor is rotating, e.g., a camera is rotating to survey or monitor a wider spatial area, this rotational movement of the sensor can be taken into account. For example, the exemplary rotational movement of the sensor can be synchronized with/applied to a rotation of the sampling model, such that the applying or mapping or projecting of the sampling model comprises numerical computational steps corresponding to different rotational positions of the sensor when defining the area of the image frame from which data is to be extracted, i.e., each different rotational position of the sensor corresponds to a different mapping or projecting of a/the sampling model onto an/the image frame(s).

Alternatively or in addition, a linear movement of the sensor could be taken into account by applying or mapping or projecting of the sampling model for each linear spatial position before extracting data from an/the image frame(s). Other, more complex movements of the sensor may also be taken into account.

In addition or alternatively, as indicated above, it is further possible that image frames from a plurality of different series of image frames taken by a plurality of sensors with different viewpoints for capturing image frames are sampled and analyzed, wherein applying or mapping or projecting the at least one sampling model to/onto image frames taken by the plurality of sensors can take into account the different viewpoints of the plurality of sensors, e.g., using the same or analog reference points in the image frames taken from different viewpoints.

For example, in the case of two different sensors, e.g., two cameras, observing the same scene of an array of fare gates, e.g., fare gates with a plurality of turnstiles, one sensor may observe from a position left of the array of fare gates and the other sensor from a position right of the array of fare gates, such that the behavior of each gate in the array of fare gates, i.e., the behavior of each turnstile, can be monitored and sampled from both sensors at the same time and the data extracted from images of both sensors can be merged, e.g., extracted data from the different can be concatenated to form a single multidimensional data array or tensor, before analysis of the extracted data. The analysis of the extracted data can then be carried out as analysis of a single to be detected problem or situation being observed from two different perspectives simultaneously, thereby increasing the accuracy of the analysis.

The above and herein described steps for sampling and analyzing data from at least one image frame from at least one series of image frames captured by at least one sensor can be stored as instructions on one or more computer-readable storage media, wherein the instructions when executed by one or more processors, can direct the one or more processors to perform any of the herein steps for sampling and analyzing data from at least one image frame from at least one series of image frames.

An exemplary video analytic system according to the present disclosure may comprise:

- at least one sensor, e.g., a camera, configured for capturing image frames,
- and at least one computing system comprising one or more processors configured to carry out a method for sampling and analyzing data from image frames captured by at least one sensor according to any of the above and herein described steps for sampling and analyzing data from at least one image frame.

Possible exemplary camera types may inter alia comprise surveillance cameras, both analog and digital, internet protocol (IP) cameras, 3D-cameras, e.g., time-of-flight cameras or thermal cameras.

Exemplary processors of an exemplary video analytic system may include one or more central processing units (CPUs) and/or one or more graphical processing units (GPUs). It is to be noted, that the use of the herein described sampling models is computational efficient and the required demands on computational resources can be met by common personal computers (PCs).

BRIEF DESCRIPTION OF THE DRAWINGS

The following figures illustrate example embodiments of the present disclosure.

FIG. **5*a*** illustrates an example of a (first) fare gate problem; and

FIG. **5*b*** illustrates an example of a (second) fare gate problem.

DETAILED DESCRIPTION

Figure 1:
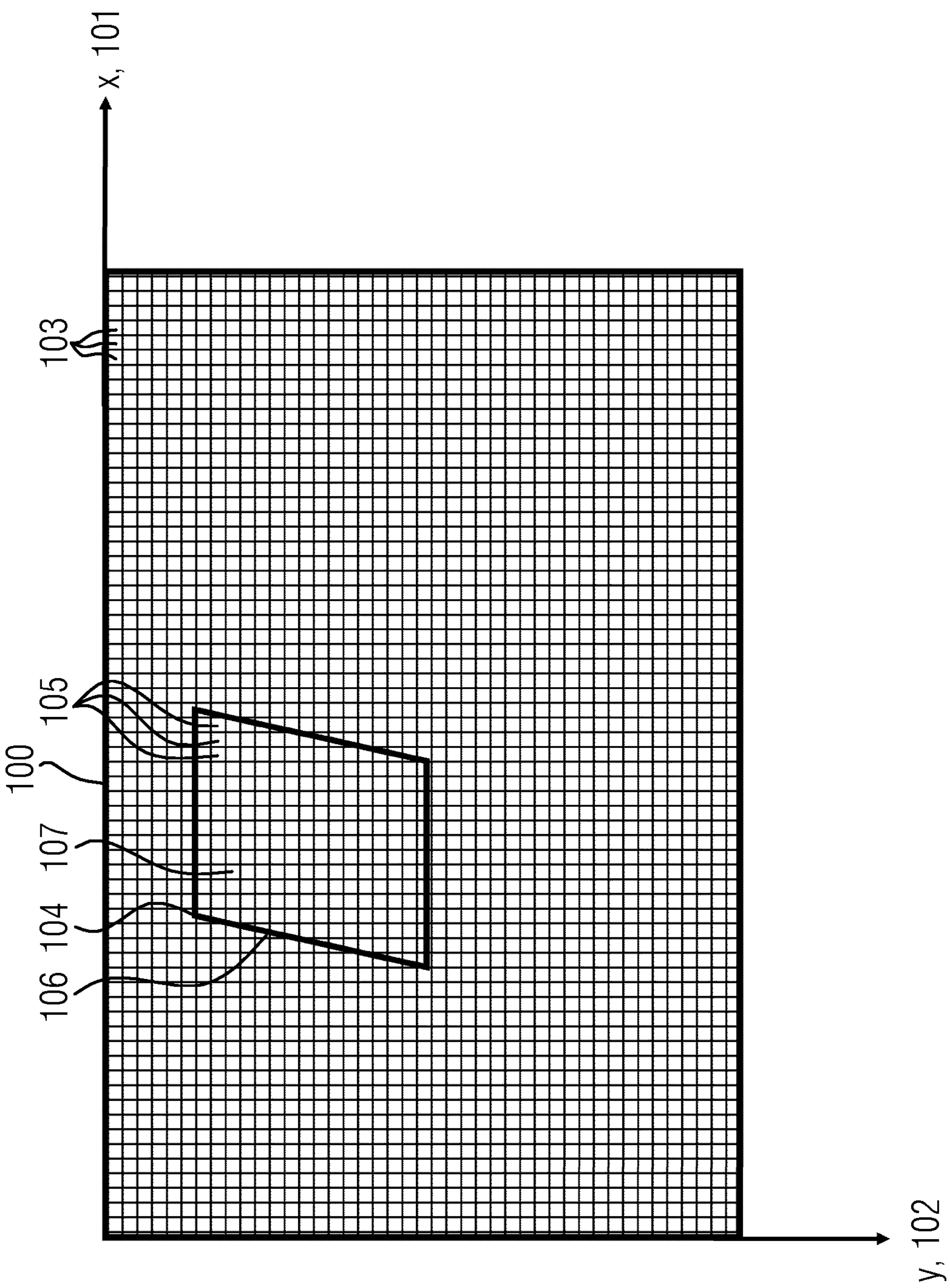
FIG. 1 illustrates an example of an image frame.

FIG. 1 schematically shows an example of an image frame 100 from at least one exemplary series of image frames captured by at least one exemplary sensor (not shown), wherein the image frame 100 has an exemplary digital format and comprises a plurality of exemplary pixels 103.

FIG. 1 further shows an exemplary projection 104 of an exemplary predetermined shape onto the image frame 100, wherein the exemplary predetermined shape is, for example, a 2D-shape in the form of a parallelogram defined in a (virtual) 3D-vector space that has been projected onto the image frame 100.

In other words, the 2D-shape can define an exemplary sampling model for sampling and analyzing data from the image frame 100, wherein the application or projection of the sampling model, i.e., the projection of the 2D-shape, i.e., a parallelogram defined in a (virtual) 3D-vector space, defines an exemplary area 107 of the at least one image frame from which data is to be extracted, i.e., an exemplary region of interest.

Stated differently, in order to sample and analyze data from the image frame 100, data is extracted only from the image frame pixels 105 that lie within the area 107 and/or on or within the perimeter 106 of the projection 104 of the sampling model, i.e., the perimeter 106 of the projection 104 of the exemplary parallelogram 2D-shape.

For completeness, it is noted that the reference numerals 101, 102 exemplary denote possible coordinate axes, e.g., an X-axis 101 and Y-axis 102, of the image frame.

Figure 2:
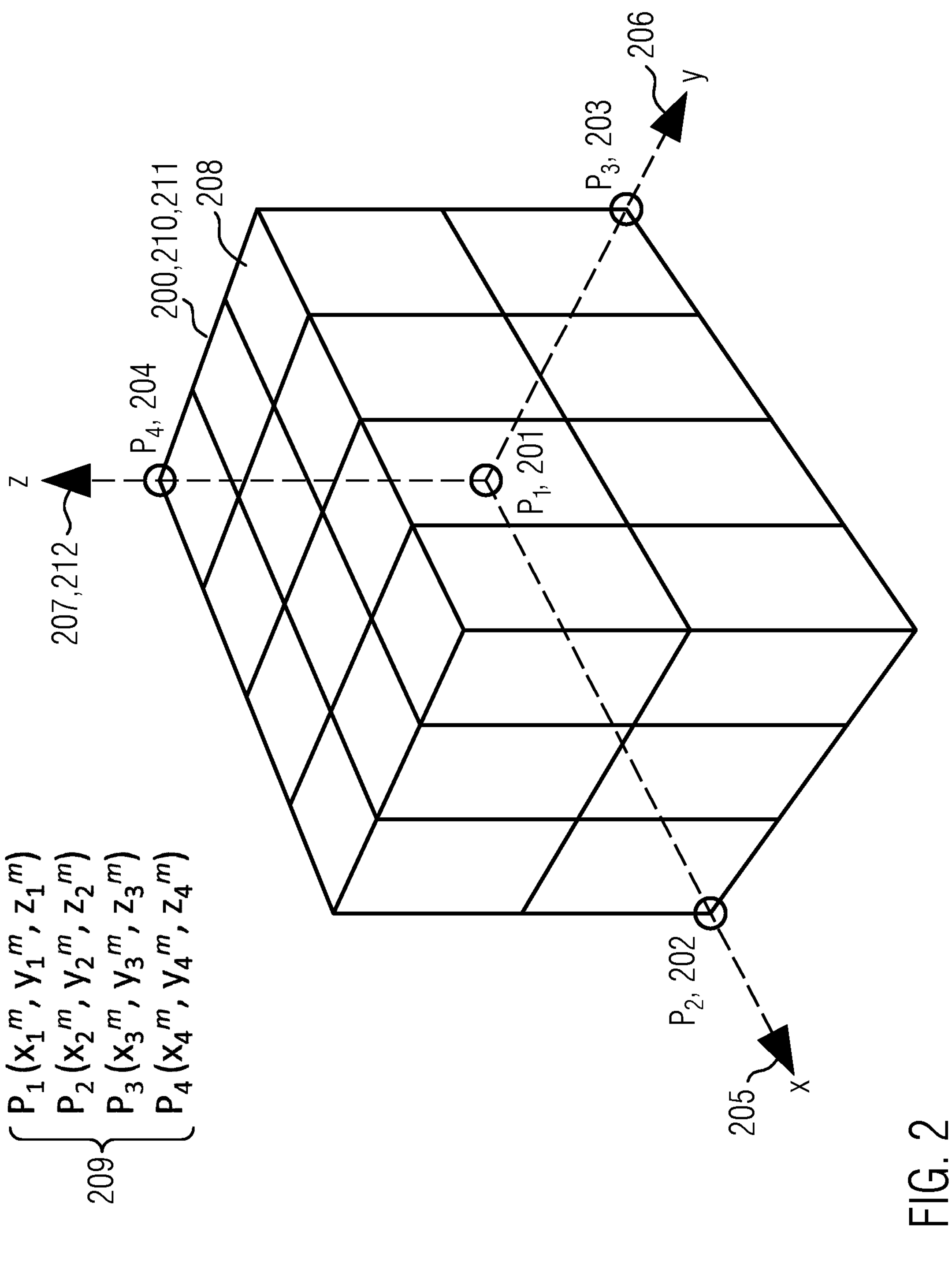
FIG. 2 illustrates an example of a 3D-shape.

FIG. 2 schematically shows an example of a possible exemplary sampling model 210 comprising a possible 3D-shape 200 in form of an exemplary cuboid 211 defined in an exemplary (virtual) 3D-vector space 212 spanned by the exemplary orthogonal coordinate axes X, 205, Y, 206, Z, 207.

The exemplary sampling model 210 or exemplary 3D-shape 200, i.e., the exemplary cuboid, is, for example, defined by four points, e.g., an exemplary set 209 of four reference points $P_1$, 201, $P_2$, 202, $P_3$, 203, $P_4$, 204, with coordinates $P_1$ $(x_1^m, y_1^m, z_1^m)$, $P_2$ $(x_2^m, y_2^m, z_2^m)$, $P_3$ $(x_3^m, y_3^m, z_3^m)$ and $P_4$ $(x_4^m, y_4^m, z_4^m)$, wherein x, y, z are coordinates of the orthogonal coordinate axes X, 205, Y, 206, Z, 207 and m in the superscript index denotes the exemplary sampling model 210 and the subscript indices 1, 2, 3 and 4 denote the number of the reference point.

Stated differently, the coordinates 209 of the exemplary reference points $P_1$, 201, $P_2$, 202, $P_3$, 203, $P_4$, 204 are exemplary provided in coordinated of the exemplary (virtual) 3D-vector space spanned by the exemplary orthogonal coordinate axes X, 205, Y, 206, Z, 207.

In the illustrated exemplary case, $P_1$ $(x_1^m, y_1^m, z_1^m)$ is located in the origin of the exemplary (virtual) 3D-vector space, i.e., $P_1 (x_1^m, y_1^m, z_1^m)=P_1 (0, 0, 0)$ and the other points are located on the exemplary coordinate axes, i.e., $P_2 (x_2^m, y_2^m, z_2^m)=P_2 (x_2^m, 0, 0)$, with $x_2^m \neq 0$, $P_3 (x_3^m, y_3^m, z_3^m)=(0, y_3^m, 0)$ with $x_3^m \neq 0$ and $P_4 (x_4^m, y_4^m, z_4^m)=(0, 0, z_4^m)$ with $x_4^m \neq 0$.

The exemplary sampling model 210 or exemplary 3D-shape 200 may, for example, represent a model of an object in real 3D-space, such as, for example, a control gate or a fare gate or a corridor or a volume in real 3D-space.

The dimensions of the exemplary sampling model 210 or exemplary 3D-shape 200 may inter alia be adjusted to better match or approximate specific dimensions and scales of different instances or realizations of the object in real 3D-space the sampling model 210 or exemplary 3D-shape 200 is supposed to represent.

This way similar objects in real 3D-space can be sampled with the same sampling model(s) and/or the same model(s) can be applied to different viewing perspectives of the same object in real 3D-space, e.g., when captured in image frames from different sensors having different points of view of the object or scene in real 3D-space. In this context, the expression of "same sampling models" can inter alia be understood as sampling models having the same topology, i.e., comprising pre-determined shapes with the same topologies.

Furthermore, the same sampling model(s) and/or the same model(s) can be applied to different objects in real 3D-space that have the same or similar shape or topology, e.g., different realizations or different instances of a control gate of fare gate at different physical location, e.g., different metro stations, captured in separate series of image frames by different sensors.

As described in general above, the pre-determined shapes in the (virtual) 3D-vector space on which the at least one sampling model can be based on, can themselves be divided into one or more elements or blocks or sub-shapes that constitute the shapes.

For example, the shapes in the 3D-vector space on which the sampling model can be based on can be divided evenly or non-evenly in any or all its geometric dimensions into one or more elements or blocks that constitute the shapes.

The elements or blocks that can constitute a shape in (virtual) 3D-vector space can also be defined as non-divisible smallest unit of a shape and may be also referred to as "shape atom" or "primitive" or "voxel."

Figure 3:
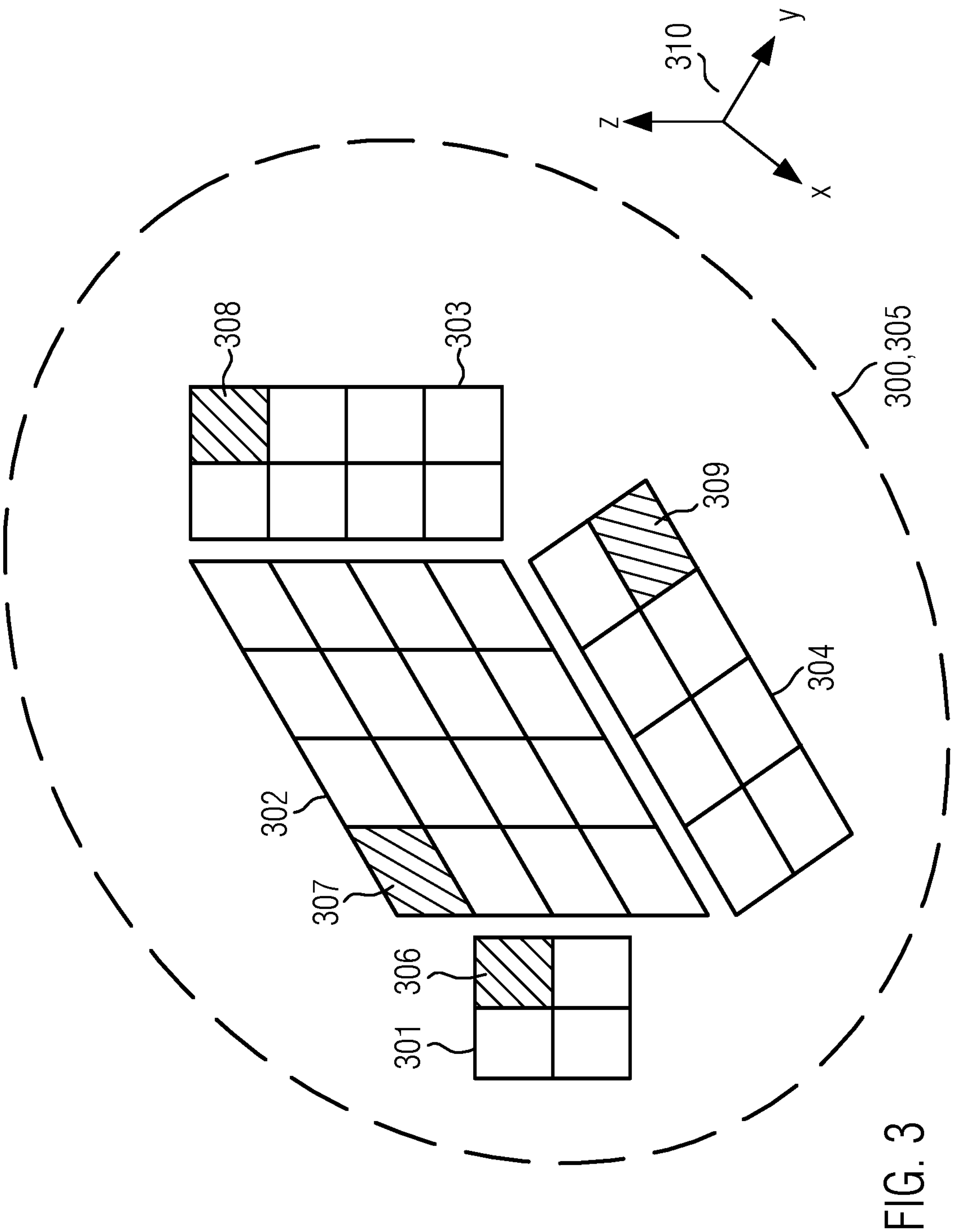
FIG. 3 illustrates an example of a sampling model.

In the exemplary case illustrated in FIG. 3, the exemplary 3D-shape 200, i.e., the exemplary cuboid 211, is divided exemplary in such voxels, by using a cut in 4 equal slices along the exemplary longitudinal direction, i.e., along the X-axis 205, e.g., which may, for example, represent a direction of subject or passenger movement, and using a cut in 3 equal slices along the exemplary transversal direction (i.e., perpendicular to the longitudinal direction, yet in the same horizontal plane), i.e., along the Y-axis 206, and using a cut in 2 equal slices along the exemplary vertical direction, i.e., along the Z-axis 207.

This exemplary division or exemplary slicing of the exemplary 3D-shape 200 then generates 4*3*2=24 smaller 3D-shapes, i.e., smaller 3D-cuboids, i.e., exemplary voxels 208.

Each of the voxels 208 can then, for example, be associated with an element and/or value in a data structure such as a multi-dimensional array, e.g., a tensor of dimensions (4, 3, 2).

It is emphasized that the herein and above-described exemplary division or slicing of the exemplary 3D-shape 200 is just an example, and other division or slicing schemes can also be applied to divide or slice an exemplary shape of an exemplary sampling model, e.g., an exemplary 3D-shape may be divided into voxels that can be associated with an element and/or value in a data structure such as a multi-dimensional array, e.g., a tensor of dimensions (i, j, k) with i, j, k being integers greater 0.

The same holds for other shapes, e.g., 2D-shapes and/or 1D-shapes of a sampling model.

In order to apply or map or project the exemplary sampling model 210, i.e., the exemplary 3D-shape 210, i.e., the exemplary 3D-cuboid 211, and its voxels 208 to/onto a two-dimensional image frame, an exemplary procedure can comprise, for example, identifying four image reference points $I_1$, $I_2$, $I_3$, $I_4$ in the image frame(s) that are easily identifiable and can be replicated in different scenes in the real 3D-space and then determine a/the mathematical transformation from the (virtual) 3D-vector space into a/the 2D-image-frame space.

The exemplary image frame space may be spanned, for example, by exemplary orthogonal coordinate axes $X^f$, $Y^f$, wherein 'f' refers to frame.

For example, a parallel projection can be simply defined with four image reference points being located at vertices of a fare gate box (see also, FIGS. 5*a* and 5*b*), with one of them being out of the plane defined by the other three.

Once these four exemplary image reference points are identified and located on the two-dimensional image frame to be sampled and analyzed, their pixel coordinates can be taken or identified.

For example, let us denote the coordinates of the exemplary image reference points $I_1$, $I_2$, $I_3$, $I_4$ as $$(x_1^f, y_1^f), (x_2^f, y_2^f), (x_3^f, y_3^f), (x_4^f, y_4^f),$$

where 'f' again refers to frame and the coordinates are provided with respect to the exemplary orthogonal coordinate axes $X^f$, $Y^f$ of the image frame.

If we associate these exemplary image reference point coordinates in the image frame with the corresponding reference point coordinates of the corresponding reference points of the exemplary sampling model 210, i.e., the exemplary 3D-shape 200, i.e., the exemplary 3D cuboid 211, i.e., with $P_1$ ($x_1^m$, $y_1^m$, $z_1^m$), $P_2$ ($x_2^m$, $y_2^m$, $z_2^m$), $P_3$ ($x_3^m$, $y_3^m$, $z_3^m$) and $P_4$ ($x_4^m$, $y_4^m$, $z_4^m$), a parallel projection from the (virtual) 3D-vector space of the sampling model 210 into a/the two-dimensional image frame can, for example, be defined by solving the following linear equations using the four pairs of reference points mentioned above, which define a system of eight equations that allow to determine the values of the mapping or projection transformation coefficients $a_j$ and $b_j$.

$$x_i^f = a_0 + a_1 x_i^m + a_2 y_i^m + a_3 z_i^m$$

$$y_i^f = b_0 + b_1 x_i^m + b_2 y_i^m + b_3 z_i^m$$

Herein, 'j' is an integer from 0 to 3 and "i" is an integer from 1 to 4 and "f" refers again to the image frame and "m" refers again to the sampling model or predetermined shape.

Hence eight variables or unknowns are to be/can be determined from the eight equations generated by the four corresponding pairs of points in the 3D-vector space of the sampling model and the 2D-image frame space.

In this example, once the values $a_i$ and $b_i$ are determined, the sampling model 210, i.e., the 3D-shape 200, i.e., the 3D-cuboid 211 and its voxels 208 can be drawn/projected onto the/a given image frame thereby defining at least one area of image frame from which data is/data values are to be extracted and can be, for example, assigned to a value of a corresponding element of a multi-dimensional array, e.g., a tensor.

In particular, each voxel of a predetermined shape, e.g., each voxel 208 of cuboid 211, can be associated to a projected voxel on the image frame and each data/data value extracted from the image frame are/from the image frame pixels covered by the projected voxel can be assigned to a value of the corresponding multi-dimensional array element, i.e., a value of the corresponding tensor element.

In other words, voxels can represent elements or be associated with elements of a multi-dimensional array, e.g., a tensor, in which data extracted from an image frame be stored and further processed for further data analysis.

As indicated before, the same or similar sampling model 210, i.e., the same or a similar 3D-shape 200 can, for example, be used to sample and analyze other fare gates of the same fare gate type or of similar geometry within the same real scene (e.g., video stream flow from the same sensor/same camera) or from other real scenes (video stream flows from other sensors/other cameras).

The data extracted from image frames with the different fare gates can then be considered as facing the same detection problem and can be solved with a single model/single modeling approach (e.g., using the same neural network, in case of machine learning), thereby bringing a general solution for many fare gates of the same type and with the same way of functioning, without the need of generating (and train, case of machine learning) additional specific solution models for additional fare gates.

This can inter alia greatly speed-up and facilitate the solving of detection problems, in particular, such as the ones described above, in video analytics.

FIG. 3 schematically shows a further example of a possible exemplary sampling model 300 comprising a set 305 of various 2D-shapes oriented and positioned in an exemplary (virtual) 3D-vector space, e.g., a first 2D-shape 301, a second 2D-shape 302, a third 2D-shape 303 and a fourth 2D-shape 304.

All of the exemplary 2D-shapes are exemplary parallelograms, with the 2D-shapes 301 and 303 being exemplary rectangles.

However, the number and form of 2D-shapes 301, 302, 303 and 304 is merely exemplary. Any other number and form of 2D-shapes orientable and positionable in an exemplary (virtual) 3D-vector space can be used as well to define/build up an exemplary sampling model 300.

The exemplary 3D-vector space in which these predetermines shapes 301, 302, 303 and 304 are positioned, is exemplary denoted with reference numeral 310.

Similar to the previous example of FIG. 3, the 2D-shapes 301, 302, 303 and 304 can be split or divided into one or more elements or blocks or sub-shapes that constitute the shapes.

The elements or blocks can also be defined as non-divisible smallest unit of a shape and may be also referred to as "shape atom" or "primitive" or "voxel."

In the example illustrated here, each shape 301, 302, 303 and 304 is exemplary divided evenly in voxels of the same size for a given shape, e.g., 2D-shape 301 is split into 2*2 voxels, i.e., four voxels 306 of the same size, 2D-shape 302 is split into 4*4 voxels, i.e., sixteen voxels 307 of the same size, 2D-shape 303 is split into 2*4, i.e., eight voxels 308 of the same size and 2D-shape 304 is split into 2*4 voxels, i.e., eight voxels 308 of the same size.

The exemplary sampling model 300 based on 2D-shapes can inter alia be used as alternative to the exemplary sampling model 210 of FIG. 2 based one or more 3D-shapes.

For example, the exemplary 2D-shapes of the exemplary sampling model 300 can be projected onto surfaces deemed relevant for the detection of a specific problem or situation or behavior to be detected, for example, surfaces of control gates or fare gates in order to detect tailgating or other fare evasion practices.

Herein and in general it is to be noted that surfaces or objects in the real physical scene observed by the sensor of the video analytic system onto which a sampling model is applied to/mapped to/projected onto do not necessarily have to be limited to correspond to actual physical surfaces.

For example, it is conceivable that artificial surfaces or objects or lines in the scene may be defined, that are defined based on their relationships to physical surfaces, objects or lines in the scene. For example, a plane that comprises or is parallel to the plane in which the exemplary sliding doors of a fare gate are moving, or a line that is in alignment with or parallel to an axis of an exemplary tripod turnstile of a fare gate.

It is also conceivable that a sampling model or a predetermined shape of a sampling model can be projected onto the scene captured by a sensor without having a direct relation to physical objects, objects or lines in the observed scene.

Depending on the complexity or specific geometry of a problem or situation to be detected, the exemplary sampling model 300 based on 2D-shapes may be preferred over the sampling model 210 based on 3D-shapes, since the processing of 2D-shapes typically generates multi-dimensional arrays, e.g., tensors, of smaller sizes for a given covered data extraction area (region of interest) as compared to 3D-shapes.

Hence, the processing of 2D-shapes in the context of the herein described video analytics method steps and system can inter alia be carried out faster and with less computational resources than the processing of 3D-shapes.

Figure 4:
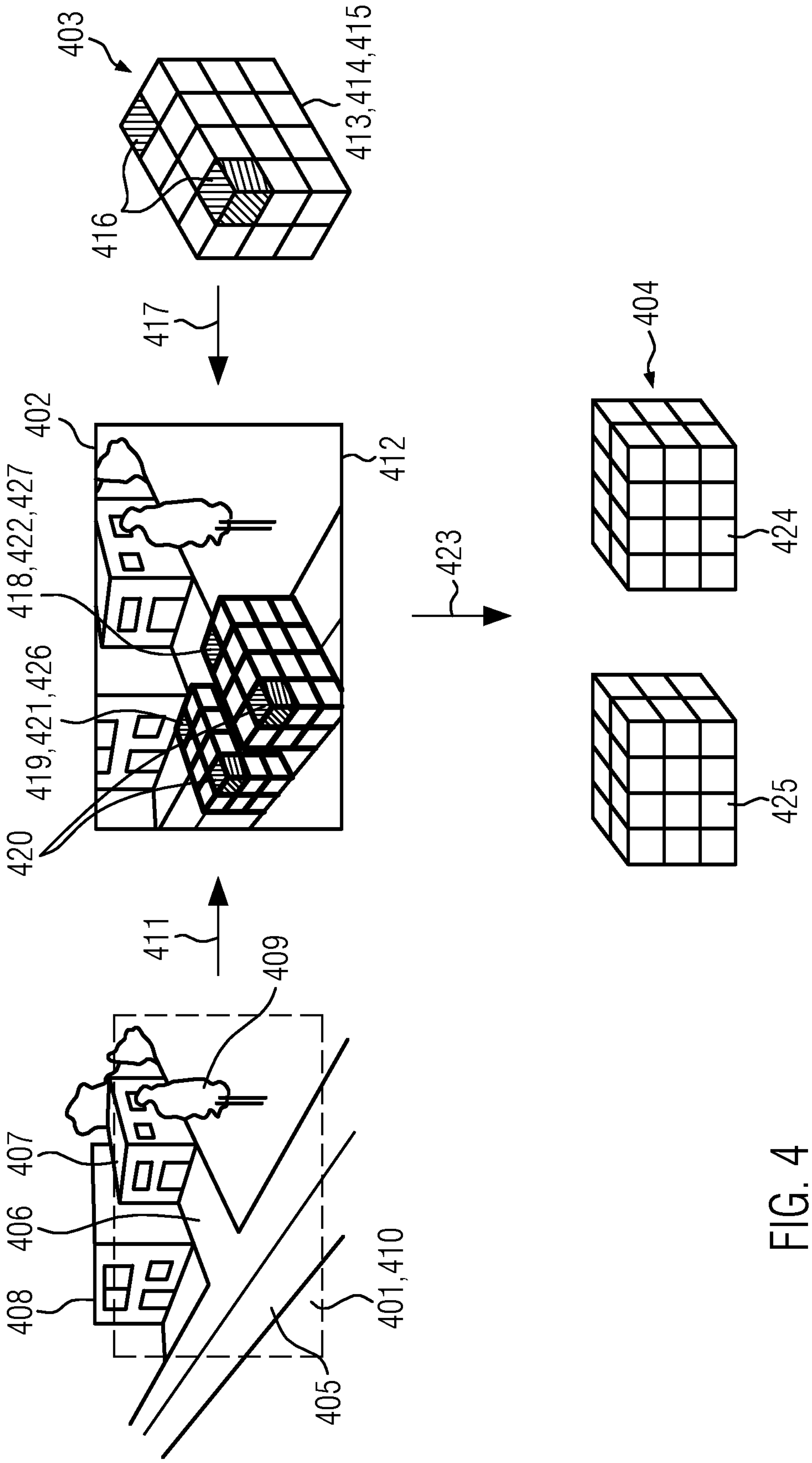
FIG. 4 illustrates an example of a schematic overview of relation between spaces.

FIG. 4 illustrates some aspects of the relations 400 between the different spaces described above and herein.

For example, an exemplary real scene 410 in real 3D-space 401 may exemplary comprise real objects such as a street 405, a house 408 with garage 407 and a tree 409 and a driveway 406 to the garage 407.

A sensor, e.g., a camera, can capture 411 this exemplary real scene 410 in at least one image frame 412 from at least one series of image frames. This exemplary image frame 412 is a two-dimensional image frame in a two-dimensional projected space (that can also be referred to as "projected 3D-space") representing a projected reality, e.g., the projection of real scene 410 or the projection of at least a part of the real scene 410. The image frame 412 is in an exemplary digital format comprising a plurality of image pixels (not shown).

Reference numeral 413 denotes an exemplary sampling model in form of an exemplary 3D-shape 414, e.g., a 3D-cuboid 415, defined in an exemplary (virtual) 3D-vector space 403.

The exemplary 3D-shape 414, i.e., exemplary 3D-cuboid 415 is exemplary subdivided or sliced or partitioned along the axes of the 3D-vector space 403 into a plurality of voxels 416, e.g., into 4*2*4=32 voxels 416.

The sampling model 413 is exemplary applied to/mapped to/projected 417 onto the image frame 412. This projection 417 may be carried out, for example, according to any of the above described steps, in particular, for example, due to identifying reference points in the image frame to be matched with reference points of the sampling model 413 and solving a system of linear equations to determine corresponding transformation coefficients for establishing a transformation between the sampling model 413 and the image frame 412.

In the exemplary case illustrated, the same sampling model 413 is applied twice, i.e., to two different parts, of the image frame 413. In this case two separate systems of linear equations to determine corresponding transformation coefficients for establishing a transformation between the sampling model 413 and the two different parts of image frame 412 are to be computed.

Hence, creating two instances or realizations 418, 419 of the sampling model 413 applied to the image frame 412 and defining two exemplary areas 421, 422 or regions of interest from which data is to be extracted for analysis to detect a specific problem or situation.

In the present case illustrated the sampling model 413 or the two instances or realizations 418, 419 of the sampling model 413 can be used to sample and extract data from two exemplary corridors or spatial volumes or segments 426, 427 along the street 405.

The to be extracted data can, for example, be extracted per projected voxel or projected voxel area 420 and can be extracted 425 into one more multi-dimensional arrays 424, 425, e.g., tensors, in an abstract or numerical data space 404 and format suitable for digital or computational processing by a processor, e.g., a graphical processing unit (GPU) or a central processing unit (CPU).

In other words, data of image frame pixels that are covered by the projected voxels 420 of the sampling model 403 can be extracted 424 into and stored in multi-dimensional arrays 424, 425, e.g., tensors.

The extracted data can then be analyzed, e.g., by applying machine learning techniques as described above, to detect a specific problem or situation or behavior.

The analysis of the extracted data may be carried out separately for different areas or regions 421, 422 of the image frame 412 covered by the sampling model 403, e.g., per instance 418, 419 of the sampling model 403, or may be carried out jointly for all areas or regions 421, 422 of the image frame 412 covered by the sampling model 403.

The extracted data can then, for example, be analyzed in order to detect the presence or transit of people and/or vehicles in the analyzed area(s) 421, 422 of the image frame 412, the direction and/or speed of such transit, individually or as a swarm (e.g., determination of flow, slowdowns, congestions and jams), the detection of objects left behind, the detection of panic situations, disorders or riots (people or vehicles moving at abnormal speeds, abnormal directions or are present in abnormal quantities) or fights, the detection of loitering or oversized objects, or speed monitoring, or estimation and/or determination of the occupancy level, or other situations.

As indicated in the general part above, the problems or situations or behaviors that can be detected based on the extracted data can be manifold and are not limited to the examples presented herein.

It is further noted, that the skilled person in view of the data extracted according to the steps and techniques described herein, is fully capable to define appropriate detection criteria for a chosen specific problem or situation or behavior.

The examples of problems or situations or behaviors that can be detected based on the extracted data merely serve to illustrate how the herein described steps and video analytics techniques for sampling and analyzing data from at least one image frame can be used to build a more accurate representation of physical three-dimensional objects as compared to state-of-the-art techniques that do not take into account the three-dimensionality of physical reality and are restricted to a representation of reality based on using a flat extraction of data from an image.

For completeness it is further noted, that it would also be possible, for example, to define a single sampling model comprising a set of two 3D-shapes, e.g., a set of two 3D-cuboids, and then apply the sampling model only once to the image frame, i.e., only establishing a single a system of linear equations to determine corresponding transformation coefficients for establishing a transformation between the sampling model 413 and the image frame 412. It is also conceivable then to store the extracted data in a single multi-dimensional array or tensor.

Figure 5A:
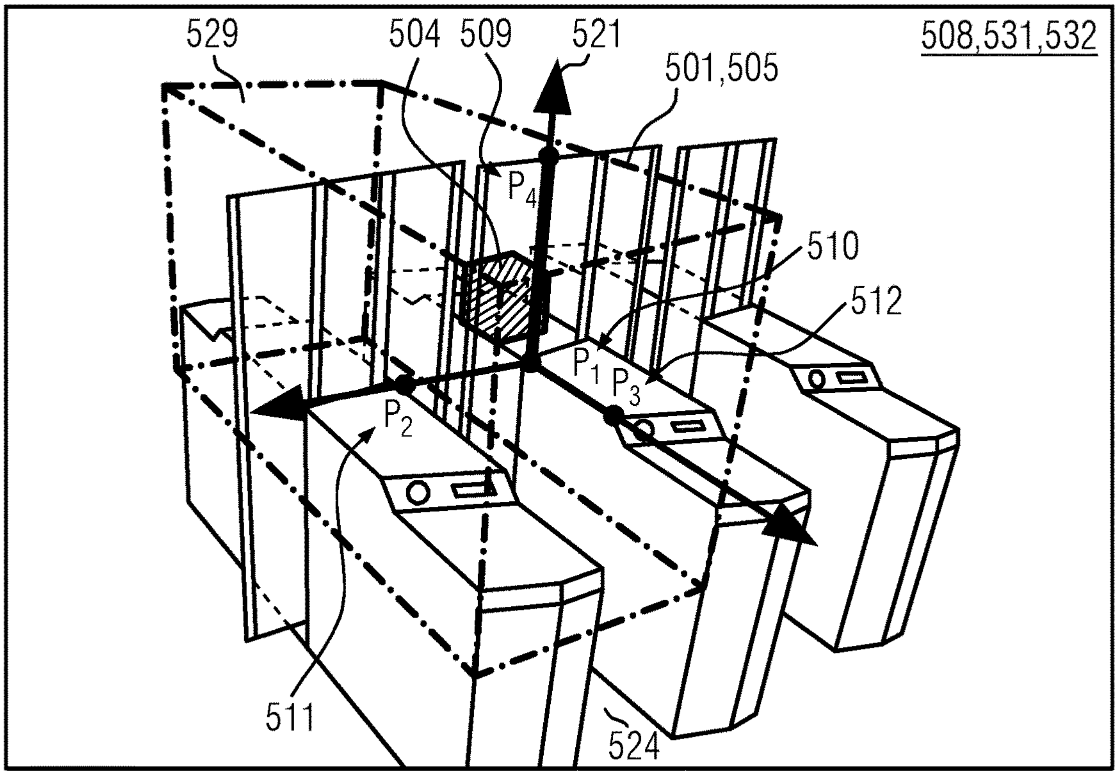

FIG. 5*a* schematically shows a real scene 508 of a fare gate system 532, e.g., a fare gate system at a metro station, captured by a sensor, e.g., a camera, in an exemplary image frame 529 from a series of image frames, wherein the fare gate 524 is, for example, to be monitored by a video analytics system to detect fare evaders or fraudulent access at a fare gate.

Superimposed on the image frame 531 is an exemplary sampling model 510 or an exemplary instance or realization or application or projection of the sampling model applied to the image frame 531.

In this example, the sampling model 510 is based on/defined by an exemplary 3D-shape in form of an exemplary 3D-cuboid 505 defined in an exemplary (virtual) 3D-vector space 521.

As previously described in general and/or specifically, exemplary reference points $P_4$, 509, $P_1$, 510, $P_2$, 511, $P_3$, 512 of the sampling model 510 have been exemplary correlated or matched with the geometry of the exemplary fare gate 524 and projected onto the image frame 531, e.g., by establishing and solving a system of linear equations between the reference points of the sampling model and reference points in the image frame to determine corresponding mapping or projections transformation coefficients. The exemplary reference points in the image frame 531 are not explicitly shown for better readability, but can, for example, be assumed to lie at the positions marked by the exemplary reference points $P_4$, 509, $P_1$, 510, $P_2$, 511, $P_3$, 512 of the sampling model 510.

Reference numeral 504 denotes an exemplary possible voxel or projected voxel 504 of the sampling model 510. For easier readability of FIG. 3, the other voxels or other projected voxels of the sampling model 510 are not explicitly drawn but can be assumed to present in the sampling model 510, i.e., in the 3D-cuboid 505.

Also the image pixel of the image frame 531 have not been drawn or marked explicitly, but it can be assumed that the image frame 531 is in a digital format comprising a plurality of pixels.

The sampling model 510 applied to/mapped to/projected onto the image frame 531 then exemplary defines an area 529 of the image frame 531 from which data is to be extracted.

As also previously described above in general and/or exemplary, data can then be extracted from image pixels that are covered by the sampling model 510, e.g., that are covered by the projected voxels 504.

The extracted data can be saved into multi-dimensional arrays, e.g., tensors.

Based on the extracted data an analysis can then be carried out in order to detect a specific problem or situation or behavior.

For example, an analysis can be carried out detect fraudulent access, e.g., fare evaders due to tailgating, at the fare gate 524.

Figure 5B:
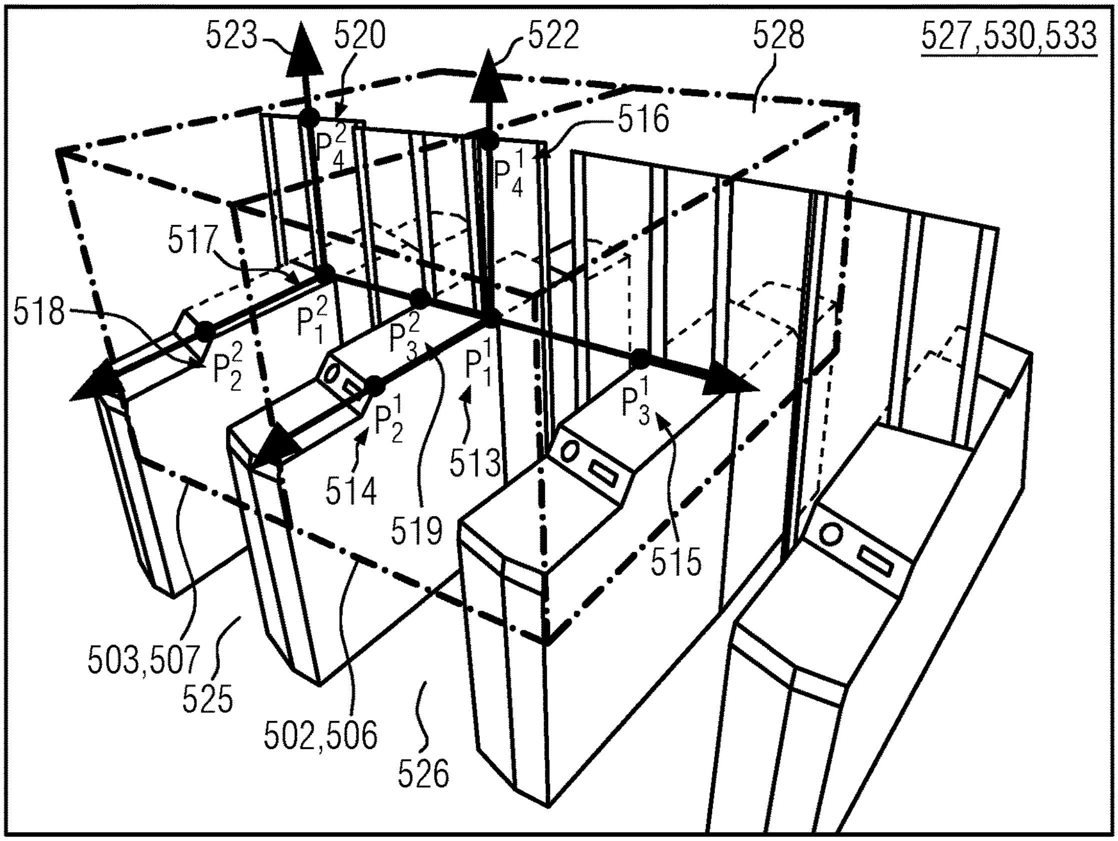

FIG. 5*b* schematically shows an alternative real scene 527 of a fare gate system 533, e.g., a fare gate system at a metro station, with an exemplary plurality of fare gates.

The exemplary fare gate system 533 can be identical or analog to the exemplary fare gate system 532 of FIG. 5*a*, albeit the exemplary fare gate system 533 is exemplary captured in an image frame 530 by sensor, e.g., a camera, with a different point view of the fare gate system as compared to the point of view of the sensor that captured the exemplary image frame 531 of the fare gate system in FIG. 5*a*.

As in FIG. 5*a*, the exemplary problem or situation or behavior to be detected by a video analytics system analyzing the image frame 530, being part of a series of image frames, e.g., a video stream, captured by a sensor, e.g., a camera, can be to detect fare evaders or fraudulent access at the fare gate system 533, specifically at fare gates 525 and 526.

Reference numerals 502, 503 denote exemplary sampling models or instances or realizations or applications or projections of a/the sampling model applied to the image frame 533.

The exemplary sampling models 502, 503, exemplary comprise exemplary 3D-cuboids 506, 507 as exemplary 3D-shapes defined in exemplary (virtual) 3D-vector spaces 522, 523 and that are shown exemplary superimposed on the image frame 530.

As previously described in general and/or specifically, exemplary reference points $P_1^1$, 513, $P_2^1$, 514, $P_3^1$, 515, $P_4^1$, 516, $P_1^2$, 517, $P_2^2$, 518, $P_3^2$, 519, $P_4^2$, 520 of the sampling models 502, 503 have been exemplary correlated or matched with the geometry of the exemplary fare gates 525, 526 and projected onto the image frame 530, e.g., by establishing and solving a corresponding system or corresponding systems of linear equations between the reference points of the sampling models and reference points in the image frame to determine corresponding mapping or projections transformation coefficients. The exemplary reference points in the image frame 530 are not explicitly shown for better readability, but can, for example, be assumed to lie at the positions marked by the exemplary reference points $P_1^1$, 513, $P_2^1$, 514, $P_3^1$, 515, $P_4^1$, 516, $P_1^2$, 517, $P_2^2$, 518, $P_3^2$, 519, $P_4^2$, 520 of the sampling models 502, 503.

For better readability of FIG. 5*b*, no elements or blocks or voxels that may constitute the exemplary predetermined 3D-shapes 506, 507 are shown in FIG. 5*b*. Nevertheless, it can be assumed as described above, that the 3D-shapes or 3D-cuboids 506, 507 can be partitioned or divided or sliced into a plurality of elements or blocks or voxels.

Also the image pixels of the image frame 530 have not been drawn or marked explicitly, but it can again be assumed that the image frame 530 is in a digital format comprising a plurality of pixels.

The sampling models 502, 503 applied to/mapped to/projected onto the image frame 530 then exemplary define an area or areas 528 of the image frame 530 from which data is to be extracted.

As also previously described above in general and/or exemplary, data can then be extracted from image pixels that are covered by the sampling models 502, 503, e.g., that are covered by projected elements or blocks or voxels of the sampling models.

The extracted data can be saved into multi-dimensional arrays, e.g., tensors.

Based on the extracted data an analysis can then be carried out in order to detect a specific problem or situation or behavior.

For example, an analysis can be carried out detect fraudulent access, e.g., fare evaders due to tailgating, at both of the fare gate 525 and 526.

As indicated also previously, it is further conceivable to define single sampling model which is based on a set of predetermined shapes, e.g., on the two predetermined 3D-shapes 502, 503 instead of treating the 3D-shapes 502, 503 as separate sampling models.

It is further noted again, that for both exemplary real scenes 508 and 527 depicted in image frames 531 and 530 the same sampling model(s) can be used, wherein same can mean identical and/or having the same topology.

The following reference numerals identify the following exemplary components in the figures.

100 Exemplary Image Frame
101 Exemplary first coordinate axis, e.g., X-axis of an exemplary image frame coordinate system
102 Exemplary second coordinate axis, e.g., Y-axis of an exemplary image frame coordinate system
103 Exemplary pixels of image frame
104 Exemplary projection of a predetermined shape onto the image frame, exemplary projection of an exemplary sampling model projected onto the image frame, exemplary region of interest
105 Exemplary pixels of image frame covered by the projection of the predetermined shape
106 Exemplary perimeter of projection of predetermined shape 104 onto image frame
107 Exemplary area of the image frame from which data is to be extracted, exemplary region of interest
200 Exemplary 3D-shape in (virtual) 3D-vector space, exemplary parallelepiped, exemplary cuboid
201 Exemplary (first) reference point with exemplary reference coordinates
202 Exemplary (second) reference point with exemplary reference coordinates
203 Exemplary (third) reference point with exemplary reference coordinates
204 Exemplary (fourth) reference point with exemplary reference coordinates
205 Exemplary (first) coordinate axis, exemplary first (virtual) 3D-vector space axis
206 Exemplary (second) coordinate axis, exemplary second (virtual) 3D-vector space axis
207 Exemplary (third) coordinate axis, exemplary third (virtual) 3D-vector space axis
208 Exemplary element or block or voxel of exemplary 3D-shape in (virtual) 3D-vector space
209 Exemplary set of reference points, exemplary (vertex) points of 3D-shape in (virtual) 3D-vector space
210 Exemplary sampling model
211 Exemplary cuboid, exemplary 3D-cuboid
212 Exemplary (virtual) 3D-vector space
300 Exemplary alternative sampling model
301 Exemplary (first) 2D-shape, exemplary parallelogram, exemplary rectangle
302 Exemplary (second) 2D-shape, exemplary parallelogram
303 Exemplary (third) 2D-shape, exemplary parallelogram, exemplary rectangle
304 Exemplary (fourth) 2D-shape, exemplary parallelogram
305 Exemplary set of predetermined shapes, exemplary set of exemplary 2D-shapes
306 Exemplary voxel of (first) 2D-shape 301
307 Exemplary voxel of (second) 2D-shape 302
308 Exemplary voxel of (third) 2D-shape 303
309 Exemplary voxel of (fourth) 2D-shape 304
310 Exemplary (virtual) 3D-vector space
400 Exemplary schematic relations between spaces
401 Exemplary real 3D-space, exemplary real physical 3D-space, exemplary real space
402 Exemplary two-dimensional projected space/exemplary projected 3D-space

403 Exemplary virtual 3D-vector space, exemplary 3D-vector space
404 Exemplary abstract or numerical multi-dimensional data space
405 Exemplary street
406 Exemplary driveway
407 Exemplary garage
408 Exemplary house
409 Exemplary tree
410 Exemplary real scene
411 Exemplary act/step of capturing or recording the exemplary real scene by a sensor, e.g., camera
412 Exemplary image frame, e.g., image frame in digital format comprising a plurality of pixels
413 Exemplary sampling model
414 Exemplary predetermined shape, exemplary 3D-shape
415 Exemplary 3D-cuboid, exemplary cuboid
416 Exemplary element or exemplary block or exemplary voxel of shape 414
417 Exemplary act/step of applying/mapping/projecting the sampling model to/onto the image frame
418 Exemplary (first) instance or realization of the sampling model 403 applied to/mapped to/projected onto image frame
419 Exemplary (second) instance or realization of the sampling model 403 applied to/mapped to/projected onto image frame
420 Exemplary projected elements or projected blocks or projected voxels, exemplary projected area of projected elements or projected blocks or projected voxels
421 Exemplary (first) area of image frame covered by the exemplary sampling model
422 Exemplary (second) area of image frame covered by the exemplary sampling model
423 Exemplary act/step of extracting data from the image frame
424 Exemplary (first) multi-dimensional data structure, e.g., multi-dimensional array, e.g., tensor
425 Exemplary (second) multi-dimensional data structure, e.g., multi-dimensional array, e.g., tensor
426 Exemplary (first) corridor or spatial volume or segment along street 405
427 Exemplary (second) corridor or spatial volume or segment along street 405
501 Exemplary sampling model, exemplary instance of sampling model
502 Exemplary sampling model, exemplary first instance of sampling model
503 Exemplary sampling model, exemplary second instance of sampling model
504 Exemplary voxel, exemplary projected voxel
505 Exemplary 3D-shape, exemplary 3D-cuboid
506 Exemplary (first) 3D-shape, exemplary 3D-cuboid
507 Exemplary (second) 3D-shape, exemplary 3D-cuboid
508 Exemplary real scene of a fare gate, exemplary image frame captured
509 Exemplary reference point $P_4$
510 Exemplary reference point $P_1$
511 Exemplary reference point $P_2$
512 Exemplary reference point $P_3$
513 Exemplary reference point $P_1^1$
514 Exemplary reference point $P_2^1$
515 Exemplary reference point $P_3^1$
516 Exemplary reference point $P_4^1$
517 Exemplary reference point $P_3^2$
518 Exemplary reference point $P_2^2$
519 Exemplary reference point $P_3^2$
520 Exemplary reference point $P_4^2$
521 Exemplary (virtual) 3D-vector space
522 Exemplary (virtual) 3D-vector space
523 Exemplary (virtual) 3D-vector space
524 Exemplary fare gate to be monitored
525 Exemplary fare gate to be monitored
526 Exemplary fare gate to be monitored
527 Exemplary real scene of a fare gate, exemplary image frame captured
528 Exemplary area or region in image frame defined be sampling model(s)
529 Exemplary area or region in image frame defined be sampling model
530 Exemplary image frame
531 Exemplary image frame
532 Exemplary fare gate system, with an exemplary plurality of fare gates
533 Exemplary fare gate system, with an exemplary plurality of fare gates

The invention claimed is:

1. A computer-implemented method for sampling and analyzing data from at least one image frame from at least one series of image frames captured by at least one sensor, the method comprising:

defining at least one sampling model, wherein the at least one sampling model is defined in a virtual 3D-vector space and is based on one or more predetermined shapes in the virtual 3D-vector space, wherein the shapes in virtual 3D-vector space on which the sampling model is based on are divided into elements or blocks that constitute the shapes;

projecting the at least one sampling model to at least one part of the at least one image frame of the at least one series of image frames, wherein the projecting of the at least one sampling model defines at least one area of the at least one image frame from which data is to be extracted;

extracting data from the at least one area of the at least one image frame defined by the at least one sampling model; and analyzing the extracted data.

2. The method of claim 1, wherein the one or more predetermined shapes in the virtual 3D-vector space is selected from at least one of the following shapes: 3D-shapes, 2D-shapes, 1D-shapes or 0D-shapes.

3. The method of claim 2, wherein the 3D-shapes are parallelepipeds, polyhedrons, spheres, or cylinders and/or wherein the 2D-shapes are planar or curved surfaces and/or parallelograms and/or wherein the 1D-shapes are line segments and/or wherein the 0D-shapes are points.

4. The method of claim 1, wherein projecting the at least one sampling model to the at least one part of the at least one image frame of the at least one series of image frames comprises correlating the at least one sampling model with one or more reference points in the at least one image frame of the at least one series of image frames.

5. The method of claim 4, wherein the correlating further comprises carrying out a mapping transformation between one or more points of the at least one sampling model and the one or more reference points in the at least one image frame of the at least one series of image frames.

6. The method of claim 1, wherein extracting data from the at least one part of the at least one image frame of the at least one series of image frames onto which the at least one sampling model was projected, comprises extracting data from image frame pixels that are in an image frame area contained in or covered by a shape of the at least one sampling model projected to the at least one part of the at least one image frame and saving the extracted data in an array.

7. The method of claim 6, further comprising extracting data from image frame pixels that are in an image frame area contained in or covered by an element or block of a shape of the at least one sampling model projected to the at least one part of the at least one image frame and storing the extracted data in an at least one array.

8. The method of claim 1, wherein the same at least one sampling model is projected to different parts of the at least one image frame of the at least one series of image frames and/or wherein the same at least one sampling model is projected to a plurality of images of the at least one series of image frames or wherein the same at least one sampling model is projected to all of the plurality of images of the at least one series of image frames.

9. The method of claim 1, wherein the extracting data from the at least one part of the at least one image frame onto which the at least one sampling model was projected, comprises transforming the data.

10. The method of claim 1, wherein the at least one image frame onto which the at least one sampling model is projected or wherein the at least one part of the at least one image frame onto which the at least one sampling model is projected, is subjected to a pre-treatment before the extracting data.

11. The method of claim 1, wherein analyzing the extracted data comprises:

analyzing the extracted data to detect a desired pattern, wherein the desired pattern comprises a predetermined situation and/or movement and/or behavior and/or action of objects and/or subjects within a real 3D-scene that is represented in the at least one part of the at least one image frame of the at least one series of image frames captured by the at least one sensor, and providing a notification or alarm upon detection of said the desired pattern; and/or using the extracted data as input for a machine learning system to train the machine learning system to detect a desired pattern, wherein the desired pattern comprises a predetermined situation and/or movement and/or behavior and/or action of objects and/or subjects within a real 3D-scene that is represented in the at least one part of the at least one image frame of the at least one series of image frames captured by the at least one sensor; and/or using the extracted data as input for a trained machine learning system for detecting a desired pattern, wherein the desired pattern comprises a predetermined situation and/or movement and/or behavior and/or action of objects and/or subjects within a real 3D-scene that is represented in the at least one part of the at least one image of the at least one series of image frames captured by the at least one sensor, and providing a notification or alarm upon detection of the desired pattern.

12. The method of claim 1, wherein projecting the at least one sampling model to at least one part of the at least one image frame of the at least one series of image frames takes into account a movement of the at least one sensor during capturing of image frames from the at least one series of image frames, and/or the method further comprises:

sampling and analyzing data from image frames from a plurality of different series of image frames taken by a plurality of sensors with different viewpoints for capturing image frames and taking into account the different viewpoints of the plurality of sensors when projecting the at least one sampling model to image frames taken by the plurality of sensors.

13. A computer-readable storage medium having stored therein instructions that, when executed by one or more processors, direct the one or more processors to perform a method according to claim 1.

14. A video analytic system, comprising:

at least one sensor configured for capturing image frames; and at least one computing system comprising one or more processors configured to carry out a method for sampling and analyzing data from image frames captured by the at least one sensor by a method according to claim 1.

15. The method of claim 1, wherein the one or more predetermined shapes in the virtual 3D-vector space on which the at least one sampling model is based is divided evenly or non-evenly in any or all its geometric dimensions into one or more elements or blocks that constitute said one or more predetermined shapes.

* * * * *